United States Patent [19]

Gee et al.

[11] 4,061,209

[45] Dec. 6, 1977

[54] DISC BRAKE CALIPER AND SUPPORT STRUCTURE

[75] Inventors: David William Gee, Lea Marston, near Sutton Coldfield, England; Horst Willi Klassen, St. Sebastian; Heinrich Bernard Rath, Koblenz-Luetzel, both of Germany

[73] Assignee: Girling Limited, Birmingham, England

[21] Appl. No.: 724,534

[22] Filed: Sept. 20, 1976

Related U.S. Application Data

[63] Continuation of Ser. No. 563,492, March 31, 1975, abandoned.

[30] Foreign Application Priority Data

Mar. 12, 1974 United Kingdom ............... 14469/74

[51] Int. Cl.[2] .............................................. F16D 65/02
[52] U.S. Cl. ..................................... 188/73.3; 188/73.5
[58] Field of Search ................... 188/73.3, 73.5, 72.4, 188/72.5

[56] References Cited

U.S. PATENT DOCUMENTS

| | | | |
|---|---|---|---|
| 3,388,774 | 6/1968 | Burnett | 188/73.5 |
| 3,656,590 | 4/1972 | Newstead | 188/73.3 X |
| 3,682,277 | 8/1972 | Brown | 188/73.3 |
| 3,768,605 | 10/1973 | Carre | 188/73.5 |
| 3,805,925 | 4/1974 | Schoenhenz | 188/73.3 |
| 3,917,033 | 11/1975 | Rath et al. | 188/73.3 |

*Primary Examiner*—George E. A. Halvosa
*Attorney, Agent, or Firm*—Scrivener, Parker, Scrivener and Clarke

[57] ABSTRACT

The brake is of the type comprising a carrier member for fixing to a vehicle, a caliper member slidably mounted on the carrier member and an actuator for urging a first friction pad onto one side of a rotatable disc to cause the caliper member to slide relative to the carrier member and apply a second friction pad to the other side of the disc. The sliding connection is provided by a pair of pins slidable in openings in one of the members, preferably the carrier member, and releasably secured to the other of the members. To prevent binding of the pins in their openings, at least one of the openings is made diametrically oversized and the associated pin is urged into an eccentric position in direct sliding contact with the wall of its opening by means of a leaf spring which also resiliently urges the pads into position in the carrier member. When both pins extend into radially oversized openings, they are relieved of drag forces which arise on brake application.

39 Claims, 4 Drawing Figures

DISC BRAKE CALIPER AND SUPPORT STRUCTURE

This is a continuation of application Ser. No. 563,492 filed Mar. 31, 1975, now abandoned.

The present invention relates to vehicle disc brakes.

The invention is particularly concerned with vehicle disc brakes of the type comprising a carrier member for fixing to a vehicle, a caliper member slidably connected to the carrier member and an actuator for urging a first friction pad onto one side of a rotatable disc to cause the caliper member to slide relative to the carrier member and apply a second friction pad to the other side of the disc.

It has been proposed to mount the caliper member on the carrier member by means of a pair of pins which are slidable in respective openings in one of the members and are secured to the other of the members. In such construction, it is necessary to centre the pins very accurately in their openings to avoid binding in operation resulting in differential braking at different vehicle wheels arising from different proportions of the available hydraulic line pressure needed to overcome initial resistance to sliding. Furthermore, under heavy braking the carrier member may deflect to produce intermittent binding of the pins in their openings.

According to the present invention, a brake of the type described has between the carrier member and the caliper member a sliding connection comprising a pair of pins slidable in one of the members and secured to the other of the members, at least one of the pins being received in an oversized opening in said one of the members and being resiliently biased into an eccentric position within the oversized opening into direct sliding engagement with the wall of the oversized opening.

The resilient biasing is preferably by a leaf spring which may directly engage the carrier member and caliper member but which in the preferred embodiment is arranged between the caliper member and the friction pads which, in turn, abut against the carrier member. Thus, the leaf spring serves both to locate the caliper member on the carrier member by taking up the clearance between said at least one pin and its opening and to locate the pads with respect to the carrier member and reduce pad rattle. The leaf spring preferably has an appreciable width in the direction of caliper sliding and functions to prevent tilting of the caliper member and thereby permit consistent pad application and help to prevent rattle even when the caliper member moves as a result of pad wear.

One or both of the pins may be provided with a sleeve which constitutes the sliding surface of the pin and which has anti-rattle, protective and/or anti-friction properties. When a pin is not provided with a sleeve, it is advantageously chromium-plated or otherwise protected from corrosion.

In a preferred embodiment, the carrier member carries both the directly actuated and the indirectly actuated pads so that brake forces experienced by the pads are transmitted to the carrier member directly rather than through the sliding connection between the caliper member and carrier member. Each of the pins is preferably formed in two parts, one of which presents the sliding surface and is permanently retained in its opening in the carrier member or caliper member. The pin to opening clearance may contain a fluid such as grease which acts as a lubricant and as protection against corrosion and which will be pumped around the clearance as the carrier member deflects during braking or as the caliper member vibrates and thereby alters the eccentric position of the pin in its oversized opening. The said fluid is preferably retained in the clearance by the same means that retain said one part of the pin in its opening, such means comprising, for example, a resilient sealing boot.

According to a second aspect of the present invention, there is provided a vehicle brake comprising a carrier member for fixing to a vehicle frame, a caliper member, and an actuator for urging a first friction pad onto a braking surface to cause the caliper member to move relative to the carrier member and apply a second friction pad to a second braking surface, the brake having between the carrier member and the caliper member a sliding connection comprising a pair of pins each of which is slidable in a diametrically oversized opening in one of the members and secured to the other of said members, both of said pins being relieved of braking forces by means which transmit such braking forces directly or indirectly from both of said pads to the carrier member. Said means may be an additional connection provided, for example, by a flexible guide plate between the caliper member and the carrier member but preferably comprise portions of the carrier member which directly engage both the directly actuated and indirectly actuated pads so that brake forces, both circumferential drag and rotational couple, are transmitted from the pads to the carrier member directly.

The invention is further described, by way of example, with reference to the accompanying drawings, in which.

Like reference numerals will be used for like parts of the three brakes.

Figure 1:
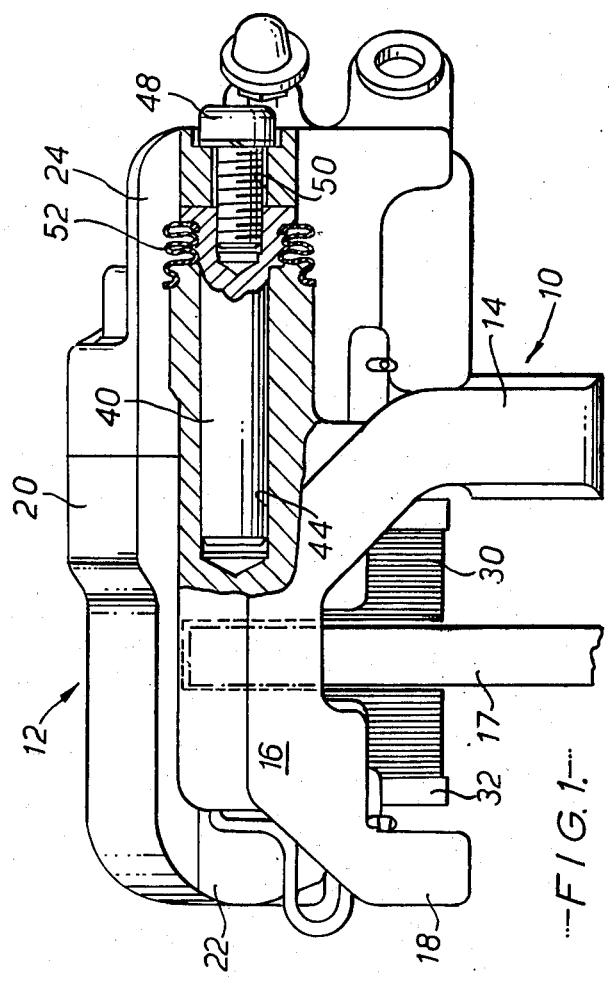
FIG. 1 is a side elevation, partly in section, of a brake to which the invention may be applied.

The disc brakes shown in the drawings are all formed of a carrier member generally designated 10 and a caliper member generally designated 12. The carrier member 10 has a downwardly extending portion 14 by which the carrier member is adapted to be fixed to a vehicle frame, and a pair of arms 16 which extend across a rotatable disc 17 to terminate in downwardly extending portions 18. The caliper member 12 has a centrally apertured crown portion 20 which interconnects a front limb 22 and a rear limb 24 extending downwardly on opposite sides of the disc. The rear limb 24 of the caliper member is formed with a pair of hydraulic cylinders containing respective pistons (not shown) which abut against a directly actuated friction pad 30. A second, indirectly actuated friction pad 32 is engaged by the front limb 22 of the caliper member. As is clear from FIGS. 3 and 4, the carrier member is formed with sliding surfaces 34 for engagement with the sides of the back plates of the friction pads. The pads 30 and 32 are therefore slidably mounted in the carrier member so that drag forces experienced by the friction pads when they are clamped against a rotating disc are transmitted directly to the carrier members. Lugs 36 extending from the pad back plates slidably seat on shoulders 38 formed on the carrier member.

The caliper member is slidably mounted on the carrier member so that introduction of hydraulic fluid under pressure into the cylinders to cause the directly actuated pad 30 to be urged against one side of the disc 17 results in the caliper member sliding away from the disc and applying the indirectly actuated pad 32 to the other side of the disc.

Figure 2:
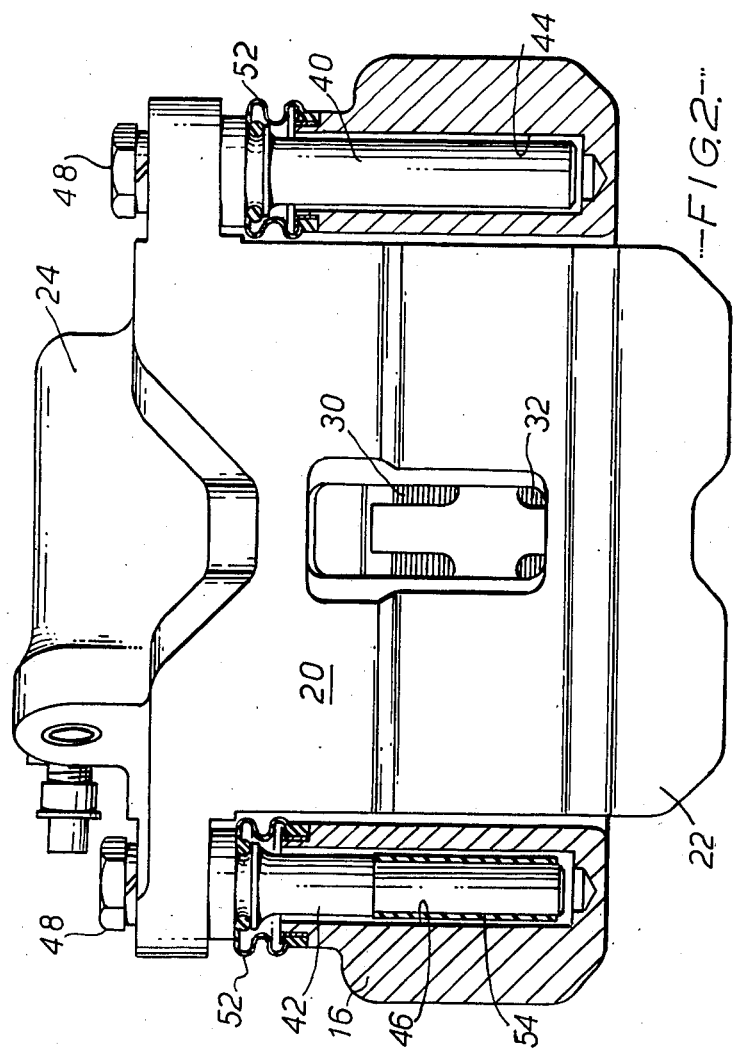
FIG. 2 is a plan view, partly in section of a modified brake incorporating the invention.
Figure 3:
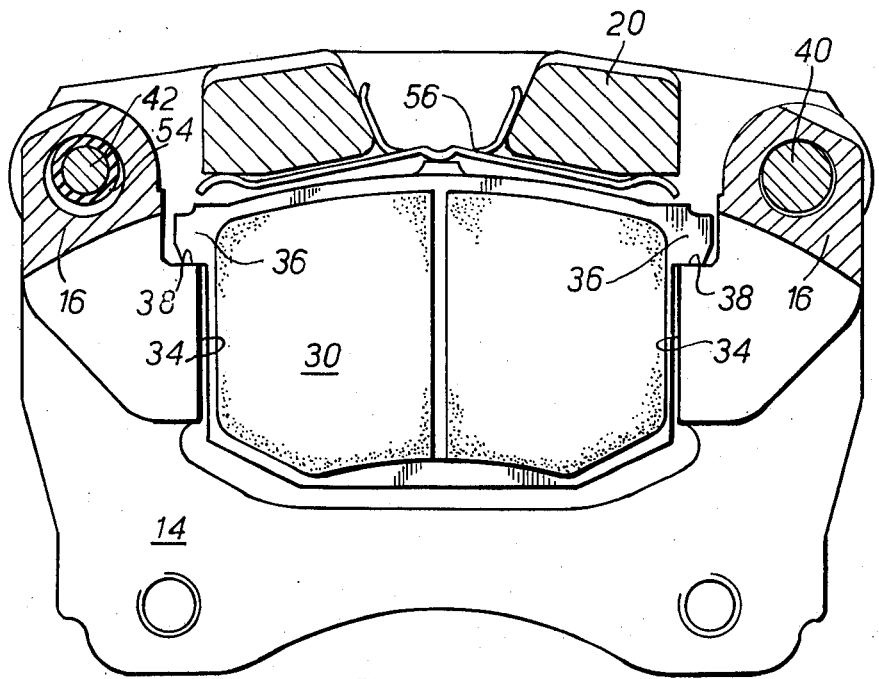
FIG. 3 is a section through a further modified form of brake shown in its rest condition.
Figure 4:
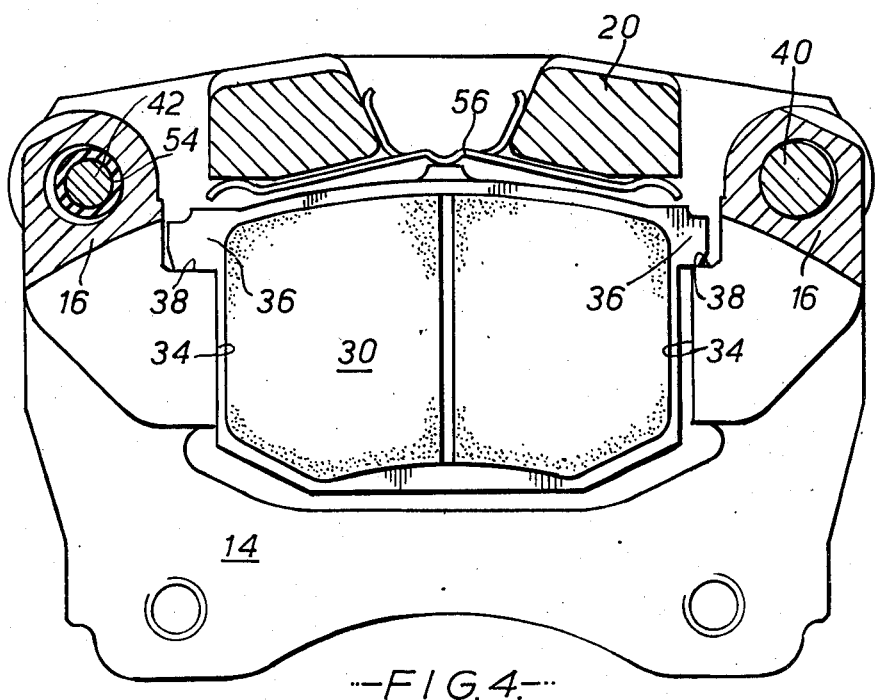
FIG. 4 shows the brake of FIG. 3 under conditions of heavy braking.

The sliding connection between the caliper member and carrier member comprises a pair of pins 40 and 42 which in FIGS. 2, 3 and 4 extend across the disc but which in FIG. 1 are confined to one side of the disc. Whilst one or both of the pins could be slidable in the caliper member, in each of the illustrated arrangements both pins 40 and 42 are secured to the caliper member and are slidable in openings 44 and 46 in the carrier member. Each pin is secured to the caliper member by a clamping screw 48 which, as shown in FIG. 1, passes through an opening 50 in the caliper member. sealing boots 52 extending between the pins and the carrier member protect the sliding surfaces of the pins and carrier member and retain the pins in their openings even when the caliper member is removed from the carrier member for servicing.

Referring to FIG. 3, each of the openings 44 and 46 is oversized so that a clearance exists between the pins and the walls of their respective openings. In the embodiment shown, the pin 42 has a greater clearance than the other. In addition, the pin 42 has a resilient sheath 54 which serves to protect the pin and reduce rattle of the pin in its opening. The two pins 40 and 42 are urged in a direction generally radially outwardly of the rotatable disc into an eccentric position and into engagement with the walls of their respective openings by a leaf spring 56 arranged between the crown portion 20 of the caliper member and the back plates of the pads 30 and 32. In addition to urging the pins 40 and 42 into the eccentric position shown in FIG. 3, the leaf spring 56 urges the pad back plate lugs 36 against the carrier member shoulders 38 and thereby locates the pads and reduces pad rattle. The clearances between the pins and the walls of their openings are filled with a lubricant such as grease.

Braking engagement between the pads and the disc results in the pads being dragged by the disc in a circumferential direction into abutment with the surfaces 34 on one side of the carrier member whereupon the drag forces are transmitted directly to the carrier member. Under conditions of heavy braking, such transference of drag forces will result in appreciable deformation of the carrier member which will alter the eccentric position of at least the pin 42 in its openings as shown in FIG. 4. In the condition illustrated in FIG. 4, the pads have been clamped against the rotating disc and have engaged the sliding surfaces 34 on the side of the carrier member into which the pin 42 extends. The circumferential drag forces applied by the rotating disc to the pads have deflected said side of the carrier member resulting in movement of the pin 42 in a direction generally radially inwardly of the disc. The side of the caliper carrying the pin 42 has therefore pivoted inwardly about the line of contact between the other pin 40 and the wall of its bore although this inward movement of the caliper is not apparent from FIG. 4. Accommodation of carrier member deformation by variation of the eccentric positions of the pins prevents binding of the pins in their openings such as may occur during heavy braking. It should be further noted that at least one pin can at all times effect radial displacement relative to its associated opening without deformation of the resilient bush.

The clearance between at least the pin 42 and its opening is preferably such that the grease is pumped around the pin over successive brake applications.

Referring to FIG. 1, it will be seen that at least one of the clamping screws 48 passes through an opening 50 which is sufficiently oversized to permit appreciable lateral movement of the clamping screw before the clamping screw has been finally tightened. It is therefore possible to adjust at least one of the pins 40 and 42 laterally during assembly of the brake so as to center the two pins in their carrier member openings 44 and 46 as shown in FIG. 3. As a result, it is possible to provide the pins with an optimum degree of lateral freedom in their carrier member openings 44 and 46, such freedom being independent of such mass-production inaccuries as may be expected in the spacings between the openings 44 and 46 and between the openings 50.

We claim:

1. A vehicle disc brake comprising a carrier member for fixing to a vehicle, a caliper member slidably connected to the carrier member and an actuator for urging a first friction pad onto one side of a rotatable disc to cause the caliper member to slide relative to the carrier member and apply a second friction pad to the other side of the disc, the sliding connection between the caliper member and carrier member comprising a pair of pins slidable in one of the members and secured to the other of the members, at least one of the pins being received in an oversized opening in said one of said members, and a resilient bush interposed between said oversized opening and said at least one pin so as to surround that pin, the fit of said at least one pin and the bush within the oversized opening being such that said at least one pin can at all times effect radial displacement relative to its associated opening without deformation of the resilient bush, and means resiliently biassing said at least one pin into an eccentric position within the oversized opening.

2. A vehicle disc brake as claimed in claim 1 in which said resilient means biases said at least one of the pins in a direction generally radially of the axis of disc rotation into said eccentric position.

3. A vehicle disc brake as claimed in claim 1 in which said resilient biasing means comprises a leaf spring.

4. A vehicle disc brake as claimed in claim 3 in which the leaf spring acts to urge the caliper member in a direction generally radially outwardly of the axis of disc rotation.

5. A vehicle disc brake as claimed in claim 4 in which the carrier member carries said first and second friction pads and in which the leaf spring is positioned between the pads, and the caliper member so as to urge the caliper member outwardly and urge the pads inwardly.

6. A vehicle disc brake as claimed in claim 1 in which; both pins are received in oversized openings.

7. A vehicle disc brake as claimed in claim 6 in which both pins are surrounded by respective resilient bushes interposed between the pins and the associated openings.

8. A vehicle disc brake as claimed in claim 1 in which the pins are releasably secured to said other of said members.

9. A vehicle disc brake as claimed in claim 8 in which each pin has a first part which is slidable in said one of said members and a second part which releasably connects said first part to said other of said members.

10. A vehicle disc brake as claimed in claim 9 including sealing means which enclose the whole of the sliding surfaces of said first parts of the pins and of openings in which they are slidable.

11. A vehicle disc brake as claimed in claim 10 in which said sealing means retain said first parts of the pins in the respective openings when the caliper member is removed from the carrier member.

12. A vehicle disc brake as claimed in claim 10 in which said sealing means are resilient sealing boots.

13. A vehicle disc brake as claimed in claim 1 in which said pin surrounded by the resilient bush is the trailing pin considered in the direction of rotation of the rotatable disc.

14. A vehicle disc brake according to claim 1 in which the resilient bush is a tight fit on said at least one pin, there being a clearance between the periphery of said bush and the surrounding opening.

15. A vehicle brake comprising a carrier member for fixing to a vehicle frame, a caliper member, and an actuator for urging a first friction pad onto a braking surface to cause the caliper to move relative to the carrier member and apply a second friction pad to a second braking surface, the brake having between the carrier member and the caliper member a sliding connection comprising a pair of pins each of which is slidable in and circumferentially surrounded by a diametrically oversized opening in one of the members and secured to the other of said members, both of said pins being relieved of braking forces by means which transmit such braking forces directly or indirectly from both of said pads to the carrier member, a resilient bush being interposed between at least one of said pins and its surrounding oversized opening, the fit of said at last one pin and said bush within the associated oversized opening being such that said at least one pin can effect radial displacement relative to the associated opening during operation of the brake, without distortion of said resilient bush.

16. A vehicle brake as claimed in claim 15 in which said means comprise portions of the carrier member which directly engage both the first and second pads so that brake forces are transmitted from the pads directly to the carrier member.

17. A vehicle brake as claimed in claim 15 in which the pins are resiliently biased into eccentric positions in their openings.

18. A vehicle brake as claimed in claim 15 in which one or each pin carries a resilient sheath which provides the sliding surface of the pin.

19. A vehicle brake as claimed in claim 15 in which the pins are releasably secured to said other of said members.

20. A vehicle brake as claimed in claim 19 in which each pin has a first part which is slidable in said one of said members and a second part which releasably secures said first part to said other of said members.

21. A vehicle brake as claimed in claim 20 including sealing means which enclose the whole of the sliding surfaces of said first parts of the pins and of openings in which they are slidable.

22. A vehicle brake as claimed in claim 21 in which said sealing means retain said first parts of the pins in the respective openings when the caliper member is removed from the carrier member.

23. A vehicle brake as claimed in claim 22 in which said sealing means are resilient sealing boots.

24. A vehicle brake comprising a carrier member for fixing to a vehicle frame, a caliper member for straddling a rotatable disc, and an actuator for urging a first friction pad onto one surface of the disc to cause the caliper member to move relative to the carrier member and apply a second friction pad to an opposite surface of the disc, the brake having between the carrier member and the caliper member a sliding connection comprising a pair of pins each of which is slidable in and circumferentially surrounded by a respective oversized opening in one of the members and secured to the other of said members, both of said pins being relieved of braking forces by means which transmit such braking forces directly or indirectly from both of said pads to the carrier member, a resilient bush being interposed betweem at least one of said pins and its surrounding oversized opening, the fit of said at least one pin and said bush within the associated oversized opening being such that said at least one pin can effect radial displacement relative to the associated opening during operation of the brake, without distortion of said resilient bush, said brake including resilient biasing means causing said pins to adopt eccentric positions in their respective oversized openings, said resilient biasing means acting in such a direction as to maintain at least when the brake is in a released condition, freedom of lateral movement of each pin in its respective oversized opening in a direction generally towards the other oversized opening, whereby to permit the sliding connection to accommodate deformation of the carrier member during brake application.

25. A brake according to claim 24 in which said pins are secured to said caliper member and in which said resilient biasing means are operable to urge said caliper member generally radially outwardly of the disc.

26. A brake according to claim 25 in which said resilient biasing means is a leaf spring engaging said caliper member.

27. A brake according to claim 26 in which said leaf spring is adapted to engage the friction pads so as to urge said friction pads radially inwardly against abutment surfaces on said carrier member.

28. A vehicle brake according to claim 24 wherein said oversized opening comprises a blind bore in said one of said members.

29. A vehicle brake comprising a carrier member for fixing to a vehicle frame, a caliper member for straddling a rotatable disc, and an actuator for urging a first friction pad onto one surface of the disc to cause the caliper to move relative to the carrier member and apply a second friction pad to an opposite surface of the disc, the brake having between the carrier member and the caliper member a sliding connection comprising a pair of pins each of which is slidable in and circumferentially surrounded by a respective opening in one of the members and secured to the other of said members, both of said pins being relieved of braking forces by means which transmit such braking forces directly or indirectly from both of said pads to the carrier member, at least one of said pins being received in an oversized opening in said one of said members, a resilient bush being interposed between said oversized opening and said at least one pin so as to surround that pin, the fit of said at least one pin and the bush within the oversized opening being such that said at least one pin can at all times effect radial displacement relative to its associated opening without deformation of the resilient bush, and at least one of said pins being secured to said other member in such a manner as to be laterally adjustable with respect to said other member whereby to permit accurate lateral positioning in the or each oversized opening of the pin or pins.

30. A brake according to claim 29 in which the or each laterally adjustable pin is secured to said other member by releasable clamping means.

31. A brake according to claim 30 in which said clamping means comprises a clamping screw in screw-threaded engagement with the pin and passing through an opening in said other member so as to clamp the pin against said other member, said opening in said other member being sufficiently oversized as to permit lateral movement of said clamping screw in said opening prior to rigid clamping of the pin against said other member by said clamping screw.

32. A vehicle brake comprising a carrier member for fixing to a vehicle frame, a caliper member for straddling a rotatable disc, and an actuator for urging a first friction pad onto a one surface of the disc to cause the caliper to move relative to the carrier member and apply a second friction pad to an opposite surface of the disc, the brake having between the carrier member and the caliper member a sliding connection comprising a pair of pins each of which is slidable in and circumferentially surrounded by a respective oversized opening in one of the members and secured to the other of said members, at least one of said pins being secured to said other member in such a manner as to be laterally adjustable with respect to said other member, both of said pins being relieved of braking forces by means which transmit such braking forces directly or indirectly from both of said pads to the carrier member, a resilient bush being interposed between at least one of said pins and its surrounding oversized opening, the fit of said at least one pin and said bush within the associated oversized opening being such that said at least one pin can effect radial displacement relative to the associated opening during operation of the brake, without distortion of said resilient bush, said brake including resilient biasing means causing said pins to adopt eccentric positions in their respective oversized openings, said resilient biasing means acting in such a direction as to maintain, at least when the brake is in a released condition, freedom of lateral movement of each pin in its respective oversized opening in a direction generally towards the other oversized opening, whereby to permit the sliding connection to accommodate deformation of the carrier member during brake application.

33. A brake according to claim 32 in which said pins are secured to said caliper member and in which said resilient biasing means are operable to urge said caliper member generally radially outwardly of the disc.

34. A brake according to claim 33 in which said resilient biasing means is a leaf spring engaging said caliper member.

35. A brake according to claim 34 in which said leaf spring is adapted to engage the friction pads so as to urge said friction pads radially inwardly against abutment surfaces on said carrier member.

36. A brake according to claim 32 in which the or each laterally adjustable pin is secured to said other member by releasable clamping means.

37. A brake according to claim 36 in which said clamping means comprises a clamping screw in screw-threaded engagement with the pin and passing through an opening in said other member so as to clamp the pin against said other member, said opening in said other member being sufficiently oversized as to permit lateral movement of said clamping screw in said opening prior to rigid clamping of the pin against said other member by said clamping screw.

38. A vehicle brake comprising a carrier member for fixing to a vehicle frame, a caliper member for straddling a rotatable disc, and an actuator for urging a first friction pad onto one surface of the disc to cause the caliper to move relative to the carrier member and apply a second friction pad to an opposite surface of the disc, the brake having between the carrier member and the caliper member a sliding connection comprising a pair of pins each of which is slidable in and circumferentially surrounded by a respective opening in one of the members and secured to the other of said members, both of said pins being relieved of braking forces by means which transmit such braking forces directly or indirectly from both of said pads to the carrier member, at least one of said pins being received in an oversized opening in said one of said members, a resilient bush being interposed between said oversized opening and said at least one pin so as to surround that pin, the fit of said at least one pin and the bush within the oversized opening being such that said at least one pin can at all times effect radial displacement relative to its associated opening without deformation of the resilient bush.

39. A sliding caliper disc brake, comprising a rotatable disc, a carrier member, a pair of friction pads, a caliper member guided on guide means for sliding parallel to the axis of the disc;

a. wherein the guide means comprises a pair of radially disposed pins secured to one of the members, received in a pair of corresponding openings forming part of the other member, the construction of the brake being such that the pins slide axially relative to the openings for brake actuation purposes;

b. wherein both pins and openings are of circular section;

c. wherein a resilient biassing means is provided which biasses the caliper member radially outwardly with respect to the disc axis;

d. wherein between at least one of the pins and its corresponding opening is interposed an annular resilient bush;

d. wherein the surfaces between which the relative axial sliding takes place are sealed from the atmosphere by elastomeric seals;

f. and wherein the fit of the pin and of the bush with respect to the opening is such that the pin may move at right angles to the disc axis with respect to the opening without deformation of the resilient bush.

* * * * *

UNITED STATES PATENT AND TRADEMARK OFFICE
CERTIFICATE OF CORRECTION

PATENT NO. : 4,061,209
DATED : December 6, 1977
INVENTOR(S) : David William Gee, Horst Willi Klassen and Heinrich Bernard Rath It is certified that error appears in the above-identified patent and that said Letters Patent are hereby corrected as shown below:

Item [30] Foreign Application Priority Data should read

-- April 2, 1974    United Kingdom.......14469/74 --.

Signed and Sealed this

Sixth Day of June 1978

[SEAL]

Attest:

RUTH C. MASON
*Attesting Officer*

DONALD W. BANNER
*Commissioner of Patents and Trademarks*